United States Patent [19]

Takemura et al.

[11] Patent Number: 4,720,028
[45] Date of Patent: Jan. 19, 1988

[54] DEVICE FOR HANGING A GARMENT IN A VEHICLE

[75] Inventors: Hiroshi Takemura, Saitama; Naoaki Tsuchiya, Tokyo, both of Japan

[73] Assignee: Honda Giken Kogyo Kabushiki Kaisha, Tokyo, Japan

[21] Appl. No.: 853,771

[22] Filed: Apr. 18, 1986

[30] Foreign Application Priority Data

Apr. 19, 1985 [JP] Japan .............................. 60-58587[U]

[51] Int. Cl.⁴ .............................................. B60R 7/08
[52] U.S. Cl. .............................. 224/42.45 A; 224/273; 224/313
[58] Field of Search ............ 224/313, 42.42, 42.46 R, 224/311, 42.45 A, 42.46 A; 248/304, 307, 308

[56] References Cited

U.S. PATENT DOCUMENTS 4,444,344  4/1984  Marcus et al. ..................... 224/313

Primary Examiner—Henry J. Recla
Assistant Examiner—David Voorhees
Attorney, Agent, or Firm—Lyon & Lyon

[57] ABSTRACT

A device for hanging a garment in a vehicle includes a hook housing embedded in a vehicle wall and a hook supported by the housing either rotatable or slidable between its retracted position in which it is positioned within the housing and its hanging position in which it projects into the interior space of the vehicle.

6 Claims, 7 Drawing Figures

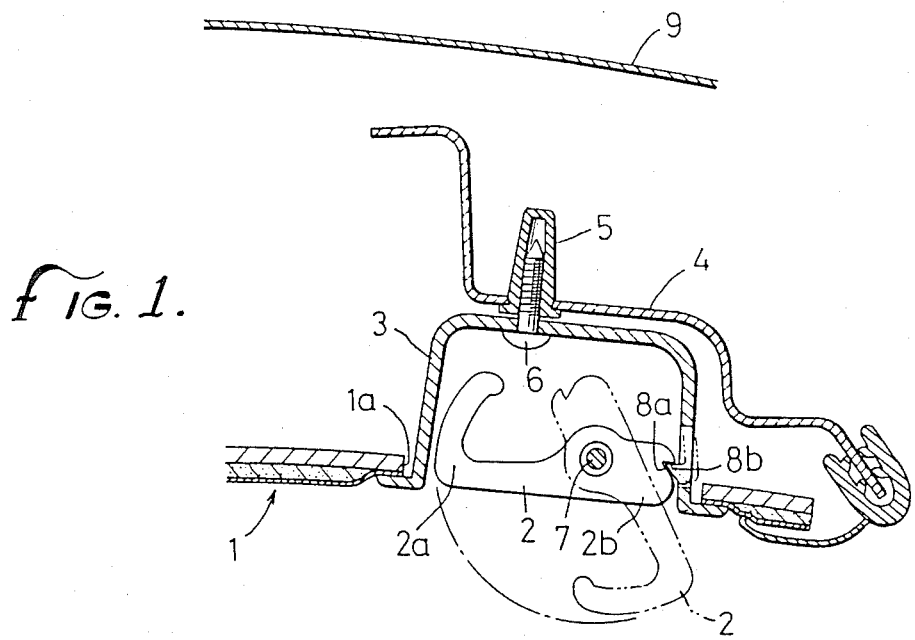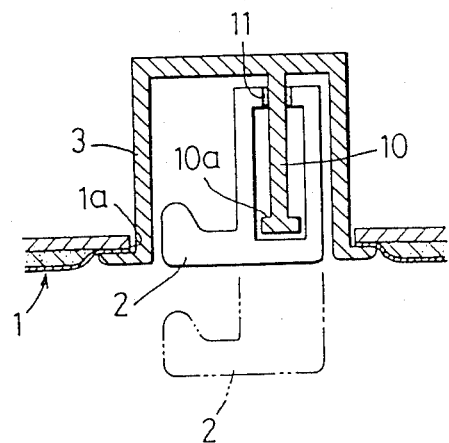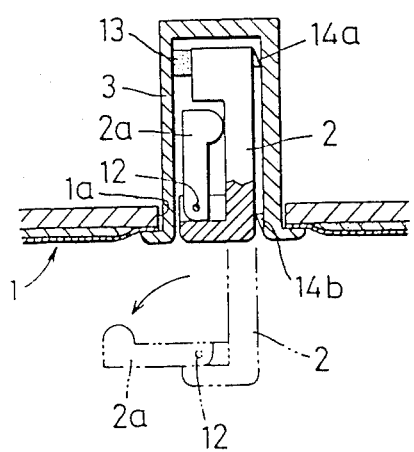

DEVICE FOR HANGING A GARMENT IN A VEHICLE

This invention relates to a device for hanging a garment in an automobile or like vehicle.

It is somewhat conventional to provide a garment hanger in an automobile or like vehicle for hanging a garment from its or sidewall. Normally the garment hanger includes a hook by which a garment is hung and the hook projects from the roof or sidewall. When the hook is not in use, therefore, it can be an obstacle. Moreover, the hook may give the interior of the vehicle an unpleasant appearance.

It is an object of this invention to provide an improved garment hanger which can overcome the drawbacks of the known device as hereinabove pointed out.

This object is attained by a device which comprises a hook housing embedded in a wall of a vehicle and a hook provided in the housing movable into, and out of, the housing.

When the hanger is used for hanging a garment, the hook is caused to project from the housing. When it is not used, the hook is retracted into the housing. Therefore, the hook is no longer any obstacle when it is not in use, nor does it give the interior of the vehicle any unpleasant appearance.

FIG. 1 is a vertical sectional view of a garment hanger embodying this invention;

FIG. 2 is a vertical sectional view of a garment hanger according to another embodiment of this invention;

FIG. 3 is a view similar to FIG. 2, but showing still another embodiment of this invention;

Figure 4:
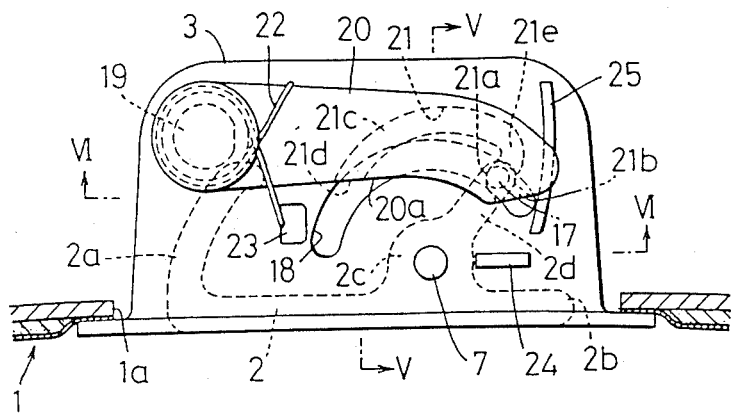
FIG. 4 is a side elevational view of a garment hanger according to a further embodiment of this invention.
Figure 5:
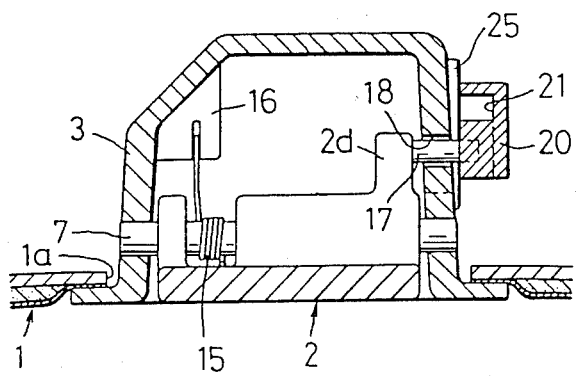
FIG. 5 is a sectional view taken along the line V—V of FIG. 4.

Referring first to FIG. 1 of the drawings, there is shown a garment hanger embodying this invention and attached to the roof of a vehicle. The roof has an inner plate 1 and an outer plate 9. The inner plate 1 has a hole 1a. The roof also has a third plate 4. The hanger includes a hook housing 3 located in the hole 1a and secured to the plate 4 by a grommet 5 and a screw 6. The hanger also includes a hook 2 supported rotatably on a horizontal shaft 7 in the housing 3. The hook 2 has a hanging portion 2a and a base portion 2b located on the opposite side of the shaft 7 from its hanging portion 2a. The base portion 2b has a notch 8a and the housing 3 has an inwardly protruding projection 8b which is engageable with the notch 8a. The hook 2 is vertically rotatable between its raised position and its lowered position. The projection 8b normally engages the notch 8a resiliently and thereby holds the hook 2 in its raised position as shown by a solid line in FIG. 1 when it is not used. When it is used for hanging a garment, the hook 2 can be rotated into its lowered position as shown by a broken line if its base portion 2b is pushed up so that the projection 8b may be retracted temporarily as shown by a broken line and thereby disengaged from the notch 8a, whereupon the hanging portion 2a is lowered by its own weight as shown by a broken line.

Another embodiment of this invention is shown in FIG. 2. It also comprises a hook 2 and a hook housing 3, but the housing 3 is provided with a vertical guide rod 10. The hook 2 is fitted about the guide rod 10 and vertically movable along it. The hook has at its top a hole which surrounds the guide rod 10, and at which it is slidable along the guide rod 10. A frictional material 11 is provided in the hole for holding the hook 2 in its raised position as shown by a solid line when it is not used. The hook 2 can be pulled down to its lowered position as shown by a broken line when it is used. The guide rod 10 has at its bottom a stop 10a which prevents the hook 2 from being detached from the guide rod 10.

The hanger which is shown in FIG. 3 is a modification to the embodiment shown in FIG. 2. It includes a foldable hook 2 having a hanging portion 2a which is foldable about a pin 12. It does not include any guide rod as shown at 10 in FIG. 2, but includes a hook housing 3 which itself serves as a member for guiding the hook 2. A frictional material 13 is provided at the top of the hook 2 between the hook 2 and the housing 3 for holding the hook 2 in its raised position when it is not used. The hook 2 has a lateral projection 14a at its top. The housing 3 is provided at its bottom with a lateral projection 14b facing the projection 14a. The projection 14b is engageable with the projection 14a to prevent any further lowering of the hook 2 when it has been pulled down to its lowered position. The hanging portion 2a can be tilted down as shown by a broken line when the hook 2 has been lowered.

Attention is now directed to FIGS. 4 to 7 showing a modification to the hanger shown in FIG. 1. It comprises a hook 2 and a hook housing 3 into which, or out of which the hook 2 can be moved by a one-touch operation. The hook 2 is rotatably supported on a horizontal shaft 7. A spring 15 has one end wound about the shaft 7, while the other end thereof is supported by a spring rest 16 provided on the inner surface of the housing 3. The spring 15 (FIG. 5) urges the hook 2 counterclockwise as viewed in FIG. 4. The hook 2 has a boss 2c at which it is supported about the shaft 7. It also has an arm 2d extending radially outwardly from the boss 2c. A horizontal pin 17 has one end attached to the arm 2d and the other end thereof projects from the housing 3 through an arcuate slot 18 which is formed in the sidewall of the housing 3.

Figure 6:
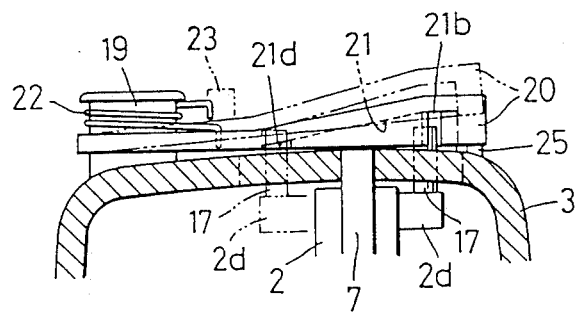
FIG. 6 is a sectional view taken along the line VI—VI of FIG. 4.

A lever 20 is provided outside the sidewall of the housing 3 rotatably about a shaft 19. The lever 20 has a surface facing the housing 3 and formed with a cam groove 21 in which the outer end of the pin 17 is fitted. The cam groove 21 has an end portion 21a which is remote from the shaft 19. The end portion 21a is substantially shaped like the letter L and has a lower end 21b which opens adjacent to the free end of the lever 20. The cam groove 21 extends arcuately from the upper end of its end portion 21a to the bottom of the lever 20 intermediate the ends of the lever 20, as shown at 21c. The arcuate portion 21c has a lower end 21d which opens at the bottom of the lever 20. The cam groove 21 has a depth which gradually decreases from the end 21b to the end 21d, as shown in FIG. 6.

A coiled spring 22 is wound about the shaft 19 and has one end supported by a spring rest 23 on the sidewall of the housing 3, while the other end thereof rests on the lever 20. The spring 22 urges the lever 20 for rotation clockwise as viewed in FIG. 4 and also urges it against the housing 3. A stop 24 is provided on the sidewall of the housing 3 for limiting the clockwise rotation of the lever 20 as viewed in FIG. 4. A ridge 25 is provided on the sidewall of the housing 3 for guiding the rotation of the lever 20.

The pin 17 is located in the L-shaped end portion 21a of the cam groove 21 as long as the hook 2 remains in its retracted or raised position within the housing 3, as shown in FIG. 4. The spring 15 urges the hook 2 counterclockwise, as hereinbefore stated, and thereby holds it in its retracted position.

If a force is applied by a finger to push up the hanging portion 2a of the hook 2 by overcoming the force of the spring 15, the pin 17 is rotated clockwise along the arcuate slot 18 and the lever 20 is simultaneously caused by the spring 22 to rotate clockwise, whereupon the pin 17 moves from the L-shaped end portion 21a of the cam groove 21 to a junction 21e between its L-shaped and arcuate portions 21a and 21c.

If the finger is released from the hanging portion 2a, the hook 2 is caused by the spring 15 to rotate counterclockwise and the pin 17 is also rotated counterclockwise along the slot 18 and the cam groove portion 21c. Since the cam groove 21 has a gradually decreasing depth, the movement of the pin 17 along the cam groove 21 causes the gradual movement of the lever 20 apart from the sidewall of the housing 3 by overcoming the force of the spring 22, as shown by solid and broken lines in FIG. 6. The pin 17 finally leaves the cam groove 21 and the lever 20 simultaneously returns to its original position shown by the solid line. The hook 2 is rotated until the pin 17 abuts on the end 18a of the slot 18 to hold the hook 2 in its hanging position as shown in FIG. 7.

Figure 7:
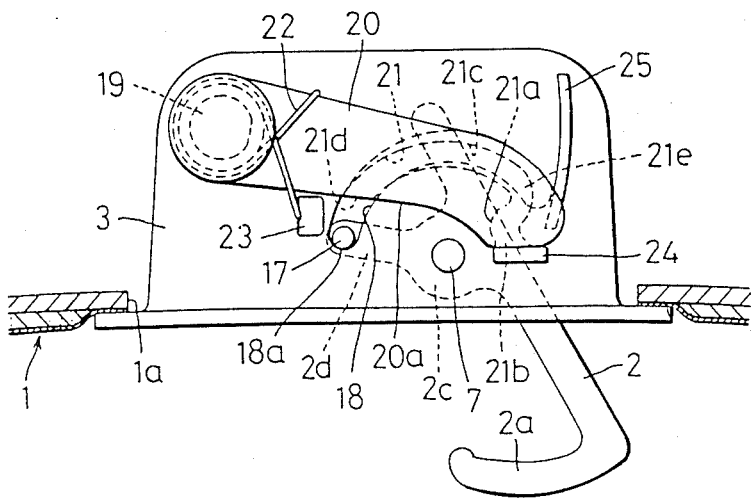
FIG. 7 is a side elevational view showing the hanger of FIG. 4 in its position in which it is used.

The hook 2 can be returned into the housing 3 if its hanging portion 2a is turned clockwise as viewed in FIG. 7. The pin 17 is moved along the slot 18 and since the lever 20 is in its original position, the pin 17 cannot enter the cam groove 21 at its open end 21d, but continues its movement in contact with the bottom 20a of the lever 20. The pin 17 enters the cam groove 21 at its open end 21b only when it has moved to the free end of the lever 20. If the force is, then, released from the hook 2, it moves back slightly and the pin 17 engages the L-shaped end portion 21a of the cam groove 21 to hold the hook 2 in its retracted position shown in FIG. 4.

In summary, each embodiment of the invention as described above and shown in the drawings provides a garment hanging device with a hook portion that is retracted when it is not in use for hanging a garment thereby eliminating the otherwise unsightly appearance and obstacle formed by conventional hooks and yet the hook may readily be extended to a position for hanging a garment.

What is claim is:

1. A device for hanging a garment in a vehicle, comprising, a hook housing embedded in a vehicle wall, a hook supported by said housing movable between a retracted position in which the hook stays within said housing and a hanging position in which the hook projects from the housing into an interior space of the vehicle, said housing being provided with a shaft on which said hook is rotatably supported, said hook having a pin, and said housing having an arcuate slot along which said pin is movable to allow said hook to rotate, and said housing being provided with a lever having having a generally arcuate cam groove in which said pin extending through said slot is engageable to hold said hook in said retracted position thereof.

2. A device as set forth in claim 5, further including a spring urging said hook into said retracted position and another spring urging said hook into said hanging position.

3. A device as set forth in claim 2, wherein said cam groove has a gradually decreasing depth to allow said pin to disengage from said cam groove to rotate said hook into said hanging position thereof.

4. A device as set forth in any of claims 1, 2 or 7 wherein said vehicle wall forms a part of the roof the vehicle.

5. A device as set forth in claims 1, 2 or 3, wherein said vehicle wall forms a part of the roof of the vehicle, and wherein a member is provided for frictionally holding said hook in said retracted position thereof, while at least said housing has a portion which holds said hook in said hanging position.

6. A device as set forth in claims 1, 2 or 3 wherein said hook includes a hanging portion pivotally connected to said hook, said hanging portion having an open and closed position, said hanging portion being placed in said closed position for compact retraction of said hook means.

* * * * *